US008239855B2

(12) United States Patent
Wetherell et al.

(10) Patent No.: US 8,239,855 B2
(45) Date of Patent: Aug. 7, 2012

(54) COMPONENT-BASED SOFTWARE INSTALLATION

(75) Inventors: Charles Wetherell, Palo Alto, CA (US); Bryn Llewellyn, San Francisco, CA (US); Chandrasekharan Iyer, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1168 days.

(21) Appl. No.: 12/056,495

(22) Filed: Mar. 27, 2008

(65) Prior Publication Data

US 2009/0249328 A1 Oct. 1, 2009

(51) Int. Cl.
*G06F 9/445* (2006.01)

(52) U.S. Cl. ........................................ 717/175; 717/106

(58) Field of Classification Search .................. 717/175, 717/106
See application file for complete search history.

(56) References Cited

U.S. PATENT DOCUMENTS

| | | | | |
|---|---|---|---|---|
| 6,301,708 B1* | 10/2001 | Gazdik et al. | ................. | 717/175 |
| 6,442,754 B1* | 8/2002 | Curtis | ............................ | 717/175 |
| 7,080,371 B1* | 7/2006 | Arnaiz et al. | ................. | 717/170 |
| 7,093,247 B2* | 8/2006 | Ashworth et al. | ............ | 717/174 |
| 7,140,013 B2* | 11/2006 | Te'eni et al. | ................... | 717/173 |
| 7,296,260 B2* | 11/2007 | Wen et al. | ....................... | 717/136 |
| 7,395,513 B2* | 7/2008 | Zimniewicz et al. | ......... | 715/841 |
| 7,398,480 B2* | 7/2008 | Zimniewicz et al. | ......... | 715/841 |
| 7,418,700 B2* | 8/2008 | Zimniewicz et al. | ......... | 717/175 |
| 7,478,385 B2* | 1/2009 | Sierer et al. | ................... | 717/174 |
| 7,823,146 B2* | 10/2010 | Surace | .......................... | 717/169 |
| 2002/0047865 A1* | 4/2002 | Bozionek et al. | ............. | 345/763 |
| 2002/0188941 A1* | 12/2002 | Cicciarelli et al. | ............ | 717/175 |
| 2004/0025157 A1* | 2/2004 | Blight et al. | .................. | 717/174 |
| 2004/0168159 A1* | 8/2004 | Wen et al. | ...................... | 717/140 |
| 2004/0199396 A1* | 10/2004 | Carter | ............................... | 705/1 |
| 2004/0255291 A1* | 12/2004 | Sierer et al. | .................... | 717/174 |
| 2005/0076064 A1* | 4/2005 | Thomas et al. | ............... | 707/200 |
| 2006/0236310 A1* | 10/2006 | Domeika et al. | .............. | 717/140 |
| 2006/0294199 A1* | 12/2006 | Bertholf | ......................... | 709/217 |
| 2007/0028229 A1* | 2/2007 | Knatcher | ....................... | 717/174 |
| 2008/0163092 A1* | 7/2008 | Rao | ................................ | 715/771 |
| 2008/0163197 A1* | 7/2008 | Rao | ................................ | 717/177 |
| 2009/0007094 A1* | 1/2009 | Hinton et al. | .................. | 717/175 |

OTHER PUBLICATIONS

Kriens, Peter, How OSGi Changed My Life, ACM QUEUE Jan./Feb. 2008, www.acmqueue.com, pp. 45-51.

\* cited by examiner

*Primary Examiner* — Shahid Alam
*Assistant Examiner* — Hua Lu
(74) *Attorney, Agent, or Firm* — Shun Yao; Park, Vaughan, Fleming & Dowler LLP

(57) ABSTRACT

A system and method for automated management of a multi-component software installation. The software product comprises multiple components that can operate independently, but which may operate better (e.g., with more or different functionality) if able to call another component (a "supplying" component). A persistent data store records the installation status of the components (e.g., as static Boolean values). Each installed component that depends on another component (i.e., can benefit from calling an element of the other component) is coded to compile conditionally, based on whether the supplying component is installed. If installed, the supplying component can be linked at compile time; if the supplying component is not installed, the installed component compiles and runs without the benefit of the supplying component.

16 Claims, 3 Drawing Sheets

COMPONENT-BASED SOFTWARE INSTALLATION

BACKGROUND

This invention relates to the fields of software and computer systems. More particularly, a system and methods are provided for managing a multi-component software installation.

Many software products are distributed in component form. Instead of a single parcel that includes all program functionality, a component-based software product comprises multiple components having different functionality. Functionality of the different modules may or may not overlap or complement each other.

This type of configuration is particularly common among suites of business software, which may offer separate components for different aspects of a business, such as: point-of-sale, invoicing, inventory, billing, accounting, payroll, etc. Different customers having different needs may purchase different permutations of a given multi-component software product, based on their individual needs.

Because the components are part of one software product, they may be configured to take advantage of other components that are available in the same computer system. Thus, if an inventory component is installed, during execution it may be automatically updated based on activity within a point-of-sale component and/or some other module. Without the inventory component, the inventory functionality may have to be performed manually or with some other software.

Existing component-based software products tend to suffer from various shortcomings, such as the inability to dynamically detect the presence of a complementary component and make use of it, while still functioning properly if that complementary component is not installed. In particular, some multi-component software products do not provide any means, or any efficient means, for automatically determining—during installation of one component—which (if any) other components are installed.

Even if this information is available, it may not be updated when one component changes (e.g., is updated or uninstalled). If connections between components are not made and broken automatically (e.g., as components are installed or uninstalled), then the customer (or some other party) may need to manage the connections manually.

Another problem in some installations is that a customer may be able to identify components that it has not purchased. For example, the installation may place a catalog or list of all product components on the customer's system, possibly to allow the installer to identify which components are already installed so that the software can create the necessary connections. The vendor of the multi-component software may prefer that customers not be able to detect, based on their product configuration, what other components are available.

Yet another problem lies in the desire for graceful degradation of the software if one component is uninstalled or altered (e.g., to turn off some functionality). If the software environment does not automatically detect this change and alter the connections between components as necessary (e.g., to avoid calling a component that no longer offers functionality that it had previously), the whole product may fail or exhibit poor performance.

SUMMARY

In one embodiment of the invention, a system and methods are provided for automated management of a multi-component software installation. The software product comprises multiple components that can operate independently, but which may operate better (e.g., with more or different functionality) if able to call another component. For example, a Payroll component may be able to accomplish more if a Tax component is installed, in which case the Payroll component can invoke interfaces, procedures, functions or other elements offered by the Tax component.

A persistent data store records the installation status of the various components (e.g., as static Boolean values), or at least statuses of the components that are installed. Each installed component (a "dependent" component) that depends on a "supplying" component (i.e., can benefit from calling or using an element of the supplying component) is coded to compile conditionally, based on whether the supplying component is installed. If installed, the supplying component can be linked at compile time; if the supplying component is not installed, the dependent component compiles and runs without the benefit of the supplying component.

All installed components are configured to depend on the data store, and with automatic dependency checking, after the data store is updated (e.g., to reflect installation or uninstallation of a component), when a functional component is invoked it will be automatically recompiled because the data store will be recognized as being more recent. The recompiled component thereby accesses any updated static constants and may now be able to call upon a supplying component that was not previously available.

In various embodiments of the invention, several useful features are offered or supported by an installation module or mechanism for the software product, or the programming language or environment in which the software operates. In particular, some form of conditional compilation is supported, along with the ability to automatically detect dependencies between components, and also to detect when a supplying component is more recent than a component that could call the supplying component.

DETAILED DESCRIPTION

Figure 1:
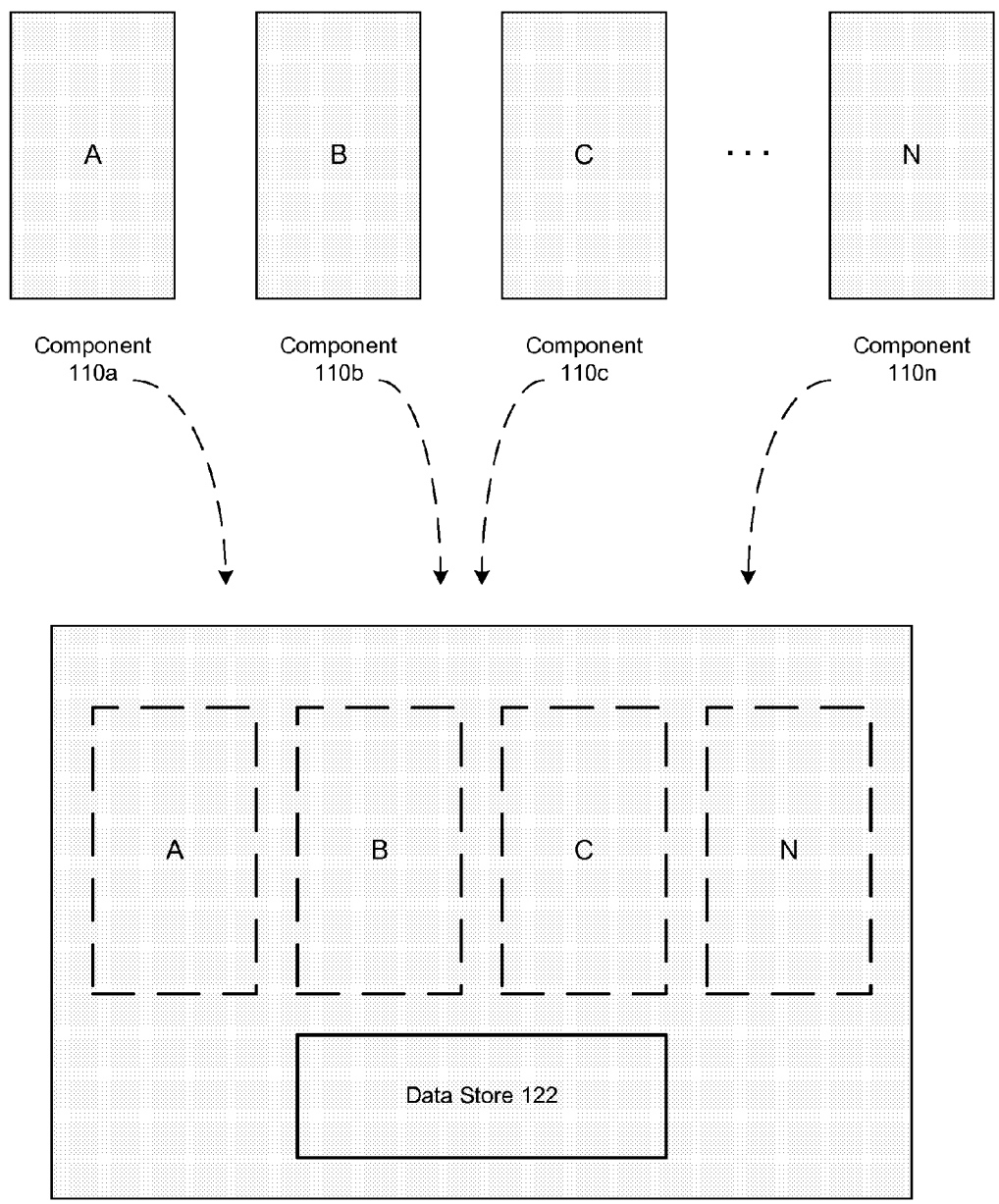
FIG. 1 is a block diagram depicting a computing environment in which an embodiment of the present invention may be implemented.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In an embodiment of the invention, a system and method are provided for automated management of a multi-component software product, to facilitate cooperation between complementary components. The software comprises multiple components that, while designed to perform different functions and able to execute independently, may offer yet further functionality or run faster or more efficiently when executed together (i.e., when one can call an interface, function, procedure or other element of a different component). The term "component" is intended to encompass virtually all types of program units, such as modules, procedures, packages, containers, etc., which may be employed by particular programming languages or in particular programming environments.

In this embodiment, the software environment automatically adjusts to the installation of another component of the product, and also adjusts automatically when a component is modified (e.g., uninstalled, upgraded or downgraded to a different version, recompiled). When it detects the modification of one component, it ensures that any other component that can or does make use of (e.g., is configured to call) the modified component is updated as necessary (e.g., recompiled).

In this embodiment, the software product components are written in a programming or scripting language that supports dynamic dependency analysis among components and the automatic checking and revalidation of those dependencies to identify if a "supplying" component—a component that is called by another component—is more recent (e.g., has been compiled more recently) than the component performing the call. In this case the calling or "dependent" component is then automatically (or manually) recompiled to ensure any updates to the supplying component are captured.

Herein, one component is deemed to be dependent on another if it can be improved by the presence of the other—that is, if it is configured to call the other component when available—regardless of whether the other component is actually installed.

Yet further, the software environment supports conditional compilation or a similar feature that allows a component, or code within a component, to be compiled conditionally. As described below, this feature allows a given component to make use of supplying components that are available at compile time, and yet proceed normally if that supplying component is not currently available.

For example, the programming language PL/SQL provides for conditional compilation through the use of special conditional statements that can dictate which code should or should not be compiled, depending on a test of some value that can be resolved at compile time (e.g., a static constant). Other languages provide similar features wherein an element of a missing program component can be mentioned without error, as long is no attempt is made to reference such an element during program execution.

The system provided in an embodiment of the invention comprises a persistent data store that records the presence of components of the software product. The data store may be embodied in different forms in different embodiments of the invention, for example as a database, some type of file other than a database, a unique component of the product, etc.

FIG. 1 depicts a computing environment in which an embodiment of the invention may be implemented. In this environment the software product is installed and executed on a single computer system, but in other embodiments of the invention it may be installed and operated within a distributed computer system.

In FIG. 1, multi-component software product 110 comprises any number of components, such as components A-N represented by reference numerals 110a-110n. In this embodiment, the software product is written using the PL/SQL programming language. One skilled in the art will appreciate from the discussion herein of various embodiments how another programming language or environment that supports a form of conditional compilation and automated dependency checking (e.g., dynamic Ada) may be implemented in another embodiment of the invention.

Any pattern of dependencies may exist between the components. For example, component A may comprise a Payroll module that works better or more efficiently if component B (e.g., a Tax component) is installed. Although component A will still function quite well without component B, it may benefit from the ability to call specialized elements (e.g., interfaces) of component B.

As one skilled in the art will appreciate, the component-based nature of software product 110 means that different components may be installed on computer system 120 at different times, and an installed component may be updated, downgraded or uninstalled independently of the other installed components.

Persistent data store 122 is maintained to reflect the presence (and/or absence) of components of the software product 110. In the embodiment of FIG. 1, data store 122 is implemented as a special or central component of the software product, and is updated each time another component is installed or uninstalled. In one alternative embodiment, the data store may also store other information, such as component versions, dates/times the installed components were compiled, dependencies between components, etc.

In one implementation of this embodiment of the invention, data store 122 comprises a number of static constants defined to indicate the presence (i.e., installation) of software product components on computer system 120. For example, the data store may comprise code (e.g., in PL/SQL) such as:

```
package DataStore is
    ComponentA constant boolean := TRUE;
    ComponentB constant boolean := FALSE;
    ComponentC constant boolean := FALSE;
    ComponentN constant boolean := TRUE;
end;
```

In this example, the data store indicates that components A and N are installed, while components B and C are not. In this implementation, both installed components and components upon which the installed components depend are listed in the data store, along with their installation status (e.g., True or False). Thus, assuming only component A is installed, this example indicates that component A depends upon each of components B, C and N. Component A is therefore a "dependent" component and components B, C and N are "supplying" components.

In one alternative implementation, components that are not installed may not be listed in the data store. This may help prevent an operator of computer system 120 from identifying what other (uninstalled) components exist. As described further below, in this alternative implementation separate data stores may be maintained for each installed component in order to identify its supplying components.

Data store 122 is a "central" component in that every other component (e.g., components 110a-110n) is dependent upon the data store. Every other component that has a dependency on at least one other component will include one or more references to the data store.

Because of this dependency, whenever an installed component is executed, the software environment will automatically determine whether data store 122 was updated since the executing component was last compiled. If so, the executing component will be recompiled and updated to ensure access to whatever changes were made to the data store.

Illustratively, data store 122 is installed on the computer system when a first component is installed, and is updated each time a component is installed or uninstalled—to add, update or remove an entry associated with that component. It may be removed when the last installed component is uninstalled.

Each component that can benefit by calling another component of the software product is configured to include conditional compilation code that conditionally invokes the supplying component. For example, in PL/SQL code similar to the following may be embedded in component A wherever it might call an interface, function, procedure or other element of component B:

```
$If DataStore.ComponentB $then
    <source code to compile if component B is installed>;
$else
    <source code to compile if component B is not installed>;
$end
```

The "source code to compile if component B is installed" could comprise a call to some element of component B. The conditional compilation aspect of this code allows component A to be compiled even if component B is not installed at compile time. If component B is not installed, component A functions as it would without any knowledge of the existence of component B.

The dynamic linking nature of the programming language used to create the software product ensures that each time component A is executed, any dependencies are noted (e.g., the dependency upon component B illustrated in the sample code above), including the dependency on persistent data store 122. The dates/times of those dependant components that are installed are examined and, if any are later than component A's date/time, component A is recompiled. In this manner, component A will always obtain the most recent information regarding the availability of component B.

Changes to a multi-component software installation (e.g., installs, deinstalls) may or may not continue even while an installed component is executing. Therefore, the installation of component B in the example above could be carried out in parallel while component A is running. In this event, the execution of component A may continue as if component B is not installed (i.e., based on the value of DataStore.ComponentB that was read when component A began executing), but the next time component A is executed it will be recompiled.

Figure 2A:
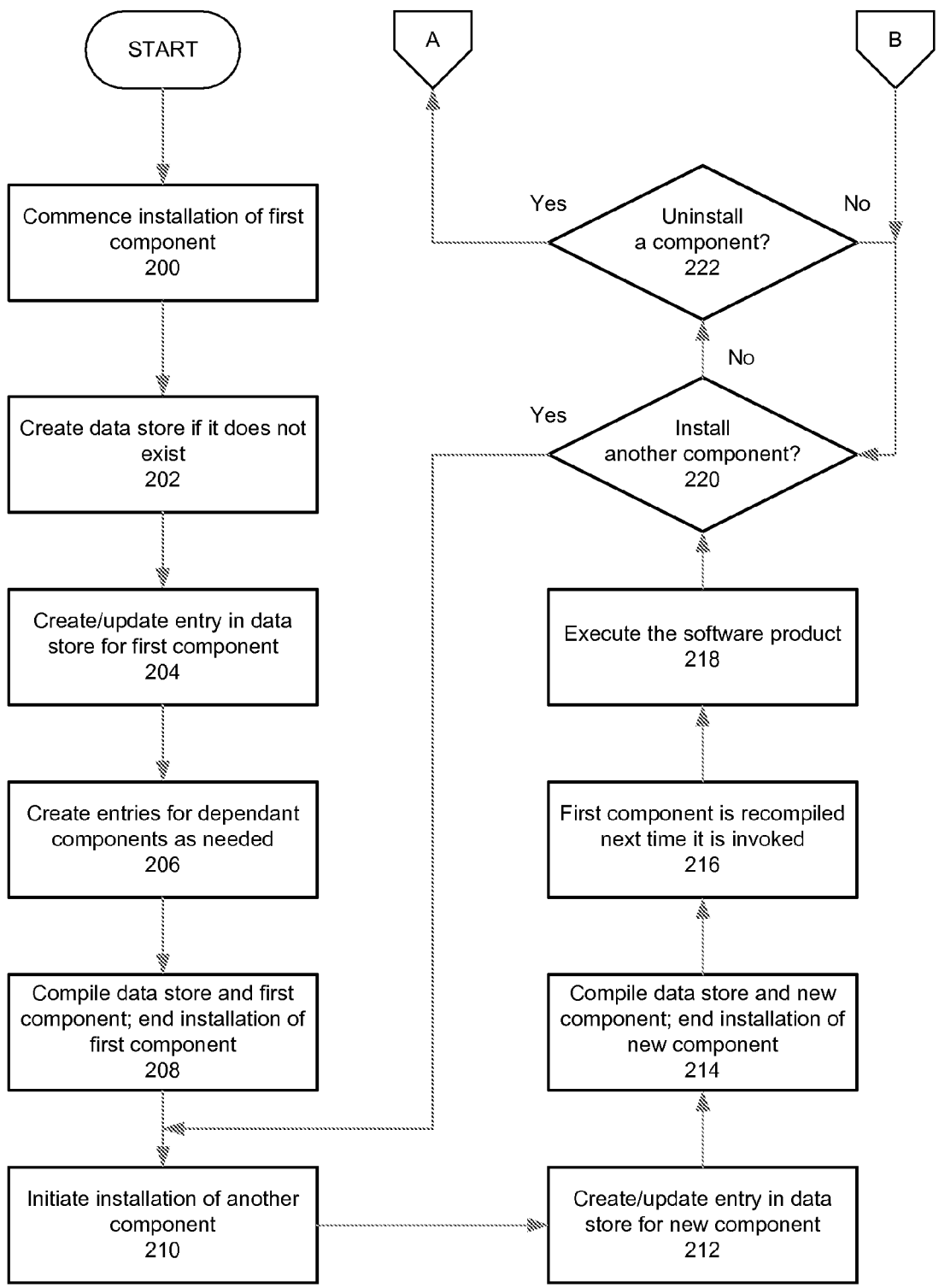
FIGS. 2A-B comprise a flowchart illustrating one method of automatic management of a multi-component software product installation, in accordance with an embodiment of the invention.
Figure 2B:
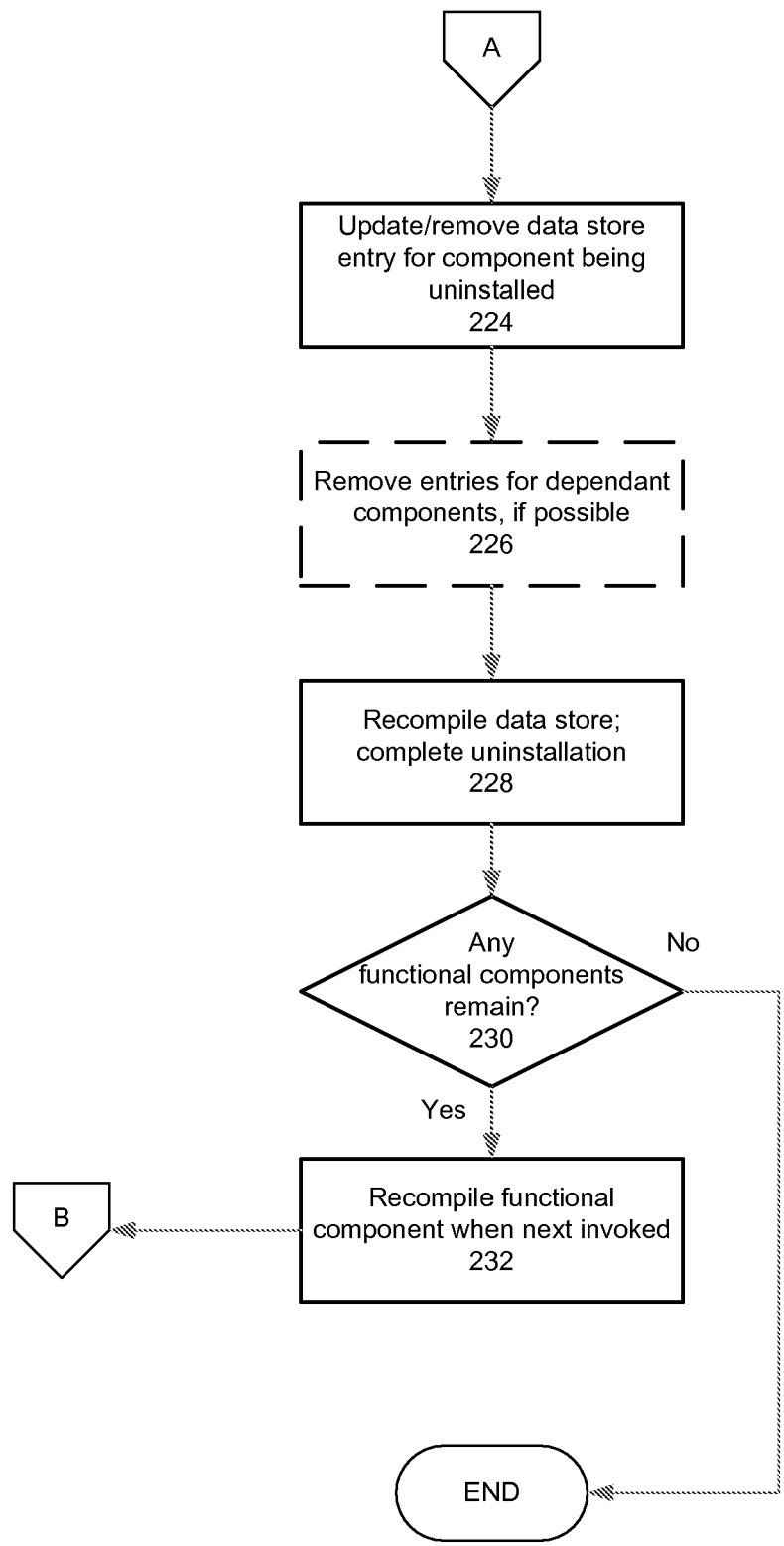

FIGS. 2A-B comprise a flowchart demonstrating a method for automated management of a multi-component software product installation, according to one embodiment of the invention. In this embodiment, the software is written in PL/SQL and the persistent data store comprises one component of the product. Other programming languages and forms of data store may be employed without exceeding the scope of the invention.

In operation 200, installation of a first component of the software commences.

In operation 202, as part of the installation process, the installer for the component (i.e., the process or program that performs the installation) determines whether the persistent data store exists, and creates it if it does not.

In operation 204, the installer creates or updates an entry in the persistent data store for the first component. In particular, if the installer had to create the data store in operation 202, or the data store already existed but did not include an entry for the first component, it now writes or updates an entry (e.g., a static Boolean value) defining the first component's installation status as TRUE.

If the data store already existed and included an entry for the first component, then the installer sets the value in that entry to TRUE, regardless of what the entry had been.

The illustrated embodiment of the invention employs Boolean values to reflect installation statuses in the data store. In other embodiments, any values may be employed that can be interpreted to signify that a component is or is not installed.

In operation 206, the installer for the first component now creates entries in the persistent data store for each component on which it depends (other than the data store component itself), and sets their installation statuses to FALSE. This ensures that when the first component is compiled, the calls into the data store to the entries for those supplying components will succeed.

If an entry for a supplying component already exists, that entry is left undisturbed. Illustratively, this may occur if multiple components are being installed simultaneously, in which case their installers or installation scripts may cooperate to configure the data store correctly to include each component's installation status (i.e., as TRUE) and to create entries for their supplying components.

In operation 208, the data store component and the first component are compiled and the installation process for the first component can complete. During compilation of the first component, because the calls to supplying components are coded using conditional compilation conditional statements (or similar types of statements that conditionally link to supplying components), compilation will be successful even though no supplying components (other than the data store) are installed.

In operation 210, installation of another component of the software product is initiated.

In operation 212, the installer for this component detects the existence of the data store, creates a data store entry for the new component and sets it to TRUE to reflect its installation. Alternatively, if the component being installed is a supplying component of a component previously installed (in which case an entry will already exist in the data store), or an entry already exists for the new component for some other reason, the installer merely updates the component's entry to TRUE, regardless of its previous value.

The installer also creates entries for any of the new component's supplying components (except the data store) that do not already have entries, and sets their values to FALSE. If any of the supplying components already have entries in the data store, they are left unchanged.

In operation 214, the data store is recompiled, the new component can be compiled and the installation process for the new component can complete.

In operation 216, the next time a component other than the data store component is invoked, the automatic dependency analysis feature of the software environment will determine whether the invoked component is older than any of its supplying components (including the data store). If so, it will be recompiled.

For example, when the first component is next invoked it will be recompiled because the data store component was recompiled more recently. This will allow the first component to automatically discover a new value for the installation status of the new component if it is configured to make use of the new component.

In operation 218, the software product is executed as desired, with installed components having the benefit of other installed components.

In operation 220, if another component is to be installed, the process returns to operation 210. Otherwise, the method returns to operation 218.

In operation 222, if an installed component is to be uninstalled, the illustrated method advances to operation 224, otherwise it returns to operation 218.

In operation 224, the uninstaller for the component to be removed updates the component's entry in the data store to FALSE to reflect its removal, or may remove the entry entirely if no other installed component depends upon it.

In optional operation 226, for supplying components of the component being uninstalled that no other installed components depend upon, the uninstaller may remove corresponding entries from the data store.

For purposes of determining if a component's entry can be removed from the data store, information such as the number of installed components that depend on that component may be included in the data store. Such information would be updated (e.g., decremented) each time a component that depends on the supplying component is uninstalled.

Alternatively, and as described below, in an alternative embodiment of the invention a secondary data store may be maintained for each installed component to identify its supplying components and their installation statuses. This secondary data store may be deleted when the installed component is uninstalled.

In operation 228, the data store is recompiled and the uninstallation process for the removed component can complete.

In operation 230, the next time the first component or any other functional component (e.g., a component other than the data store) is invoked, the recent recompilation of the data store will be detected and the component will be recompiled, after which it will function as it is designed to do without access to the uninstalled component. When a last functional component is uninstalled, the data store may be automatically removed as well.

After operation 230, the illustrated method ends (e.g., if the uninstalled component was the last remaining component of the software product) or returns to operation 218.

In one alternative embodiment of the invention, a database may be used as the persistent data store. In this embodiment, each component of the software product is configured to either consult the database directly, if the operative programming language permits, or may access the database via an intermediary, and a component's installer is configured to update the database accordingly.

The database may manage the dependencies between components and facilitate automatic recompilation when needed. In particular, the database may store times of compilation for the components, identify dependencies between components and can determine when one component needs to be recompiled (e.g., based on a change to the data store or another component).

In other alternative embodiments the data store may comprise some other entity besides a program component or database. As with other embodiments described herein, the data store still enables conditional compilation of program components, such as by storing the values of conditional component decision values (e.g., to indicate whether a particular supplying component is installed). Thus, the data store could comprise a set of environment variables (e.g., for the C programming language), an include file, a configuration tool (e.g., Ant), and would be updated when a component is installed, deinstalled or otherwise amended in a manner that affects component dependencies.

In another alternative embodiment of the invention, instead of using a single persistent data store to indicate the installation status of components, a two-tier data store framework may be employed.

In one implementation of this alternative embodiment of the invention, a master data store identifies only those components that are installed. No entries are generated in the master data store for an uninstalled component, even if one or more installed components depend on the uninstalled component.

Instead, during installation of a new component the installer or installation script for the new component (or some other process or module) creates a separate component-specific data store to indicate the installation status of every component that the new component can use (e.g., that it depends on). Illustratively, initial values for the component-specific data store are drawn from the master data store (e.g., installation statuses are set to TRUE for supplying components listed in the master data store), and set to FALSE for supplying components not listed in the master store.

Also during installation of a new component, the installer will update the component-specific data stores of other components as necessary. For example, for each other component identified in the master data store, the installer examines that other component's corresponding component-specific data store. If the newly installed component has an entry in that data store, the entry is changed to TRUE to reflect installation of the new component.

Because the master data store and component-specific data stores are configured as components of the multi-component software product, the installer also triggers recompilation of the data stores it updated (and possible recompilation/reinstallation of the affected functional components).

In this illustrative two-tier data store framework, when a component is uninstalled, the uninstaller or uninstallation script examines entries in the master data store. For each component identified in the master data store (other than the one being uninstalled), the uninstaller examines the corresponding component-specific data store. If it contains an entry for the component being uninstalled, that value in that entry is changed to FALSE. The departing component can then complete uninstallation and may trigger recompilation/reinstallation of the affected components.

In yet another alternative embodiment of the invention, the programming language or environment of the software product may support finer-grained dependency analysis. In particular, instead of a first component having to be recompiled whenever a second, supplying, component is modified, the first component only needs to be recompiled when the modification to the supplying component involves an element that the first component actually uses. Thus, the automatic dependency checking tracks components' dependencies upon individual elements (e.g., interfaces, functions, procedures) of supplying components.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of managing installation of a multi-component software product on a computer system, the method comprising:
    creating a persistent data store that records component presence for the software product during installation of a first component of the software product, wherein the data store includes a first entry corresponding to the first component and one or more other entries corresponding to one or more supplying components of the software product that the first component depends on, and wherein the data store is updated each time a component is installed or uninstalled;
    examining the data store during compilation of the first component to determine the installation statuses of the supplying components that the first component depends; on and
    executing the first component, which involves:
        determining whether the first component is compiled before
    the most recent update of the data store; and
        if so, recompiling the first component which involves examining the data store.

2. The method of claim 1, further comprising:
    during installation of a second component of the software product:
        setting an entry in the data store for the second component to indicate the second component is installed; and
        for each supplying component that the second component depends on, other than the data store:
            if an entry for said supplying component does not exist in the data store, creating said entry and setting said entry to indicate said component is not installed.

3. The method of claim 1, wherein one component is dependent on another component if the one component is configured to reference an element of the other component.

4. The method of claim 1, wherein said data store comprises:
    for each component installed on the computer system, a corresponding static constant configured to indicate that the component is installed;
    wherein each installed component of the software product that references a supplying component is configured to invoke said corresponding static constant for the supplying component when the installed component is compiled.

5. The method of claim 4, wherein if the corresponding static constant of the supplying component indicates the supplying component is installed, the supplying component is linked during compilation of the installed component.

6. The method of claim 4, wherein if the corresponding static constant of the supplying component does not indicate the supplying component is installed, compilation of the installed component completes without attempting to link the supplying component.

7. The method of claim 1, further comprising:
    during uninstallation of a component of the software product, setting an entry in the data store for the component being uninstalled to indicate the component is uninstalled.

8. A non-transitory computer-readable medium storing instructions that, when executed by a computer, cause the computer to perform a method of managing installation of a multi-component software product on a computer system, the method comprising:
    creating a persistent data store that records component presence for the software product during installation of a first component of the software product, wherein the data store includes a first entry corresponding to the first component and one or more other entries corresponding to one or more supplying components of the software product that the first component depends on, and wherein the data store is updated each time a component is installed or uninstalled;
    examining the data store during compilation of the first component to determine the installation statuses of the supplying components that the first component depends on; and
    executing the first component, which involves:
        determining whether the first component is compiled before
    the most recent update of the data store; and
        if so, recompiling the first component which involves examining the data store.

9. An automated method of managing installation of a multi-component software product on a computer system, the method comprising:
    (a) installing a first functional component of the software product, wherein the first functional component comprises references to elements of one or more other functional components of the software product;
    (b) determining whether a master data store component that records component presence for the software product exists, and in response to the master data store component not existing, creating the master data store component, and configuring the master data store component with an entry indicating the first functional component is installed, wherein the master data store component is updated each time a functional component is installed or uninstalled;
    (c) creating a first component-specific data store associated with the first functional component, wherein said first component-specific data store is configured to comprise:
        (1) for each of the one or more other functional components, a corresponding entry configured to indicate the installation status of the other functional component;
    (d) during compilation of the first functional component:
        (1) accessing the entries in said first component-specific data store; and
        (2) for a subset of the one or more other functional components indicated in the entries as being installed, linking referenced elements of the subset of the other functional components; and
(e) before executing the first functional component:
(1) determining whether the first functional component is compiled before the most recent update of the master data store; and
(2) if so, recompiling the first functional component.

10. The method of claim 9, further comprising:
(f) repeating (a)-(d) for a second functional component of the software product;
(g) examining said first component-specific data store associated with the first functional component; and
(h) if said first component-specific data store comprises an entry corresponding to the second functional component, configuring said entry to indicate the second functional component is installed.

11. The method of claim 9, further comprising:
(f) uninstalling an installed functional component of the software product;
(g) deleting from said master data store an entry corresponding to the uninstalled functional component;
(h) searching one or more component-specific data stores; and
(i) modifying any entries found in the one or more component-specific data stores corresponding to the uninstalled functional component, to indicate that the functional component is uninstalled.

12. The method of claim 9, wherein said (c1) comprises:
setting the installation status for each of the one or more other functional components identified in said master data store to indicate said identified functional component is installed; and
setting the installation status for any of the one or more other functional components not identified in said master data store, to indicate said other functional component is not installed.

13. The method of claim 9, further comprising:
each time a functional component of the software product is to be executed, determining whether the functional component's component-specific data store has been compiled more recently than the functional component; and
if said component-specific data store has been compiled more recently than the functional component, recompiling the functional component.

14. A non-transitory computer-readable medium storing instructions that, when executed by a computer, cause the computer to perform a method of managing installation of a multi-component software product on a computer system, the method comprising:
(a) installing a first functional component of the software product, wherein the first functional component comprises references to elements of one or more other functional components of the software product;
(b) determining whether a master data store component that records component presence for the software product exists, and in response to the master data store component not existing, creating the master data store component, and configuring the master data store component with an entry indicating the first functional component is installed, wherein the master data store component is updated each time a functional component is installed or uninstalled;
(c) creating a first component-specific data store associated with the first functional component, wherein said first component-specific data store is configured to comprise:
(1) for each of the one or more other functional components, a corresponding entry configured to indicate the installation status of the other functional component;
(d) during compilation of the first functional component:
(1) accessing the entries in said first component-specific data store; and
(2) for a subset of the one or more other functional components indicated in the entries as being installed, linking referenced elements of the subset of the other functional components; and
(e) before executing the first functional component:
(1) determining whether the first functional component is compiled before the most recent update of the master data store; and
(2) if so, recompiling the first functional component.

15. A computer system configured to execute a multi-component software product, comprising:
a processor;
a memory;
a plurality of functional components of the multi-component software product;
a data store component of the multi-component software product, configured to store installation statuses of said functional components, wherein the data store component is configured to be updated each time a functional component is installed or uninstalled;
an installation module configured to:
determine whether the data store component exists;
in response to the data store not existing, create the data store component;
install a first functional component configured to reference an element of a second functional component; and
record the installation status of the first functional component in said data store component; and
a compiler configured to compile the first functional component by:
examining said data store component;
linking the second functional component if said installation status of the second functional component within the data store component indicates that the second functional component is installed;
completing compilation of the first functional component without attempting to link the second functional component if said installation status of the second functional component within the data store component indicates that the second functional component is not installed; and
wherein the compiler is further configured to recompile the first functional component in response to the first functional component being compiled before the most recent update of the data store component.

16. The computer system of claim 15, wherein the multi-component software product is written in a language that supports automatic dependency checking.

* * * * *

UNITED STATES PATENT AND TRADEMARK OFFICE
CERTIFICATE OF CORRECTION

PATENT NO. : 8,239,855 B2  
APPLICATION NO. : 12/056495  
DATED : August 7, 2012  
INVENTOR(S) : Wetherell et al.

Page 1 of 1

It is certified that error appears in the above-identified patent and that said Letters Patent is hereby corrected as shown below:

In column 5, line 55, delete "pro duct." and insert -- product. --, therefor.

In column 9, line 35-36, in Claim 1, delete "depends; on and" and insert -- depends on; and --, therefor.

In column 11, line 22, in Claim 11, delete "(h)searching" and insert -- (h) searching --, therefor.

Signed and Sealed this
Sixth Day of November, 2012

David J. Kappos
*Director of the United States Patent and Trademark Office*